United States Patent
Lang

(10) Patent No.: US 9,133,867 B2
(45) Date of Patent: Sep. 15, 2015

(54) LINEAR MECHANICAL QUICK-RELEASE FASTENER

(75) Inventor: Günter Lang, Wernau (DE)

(73) Assignee: LANG TECHNIK GMBH, Neuhausen (DE)

( * ) Notice: Subject to any disclaimer, the term of this patent is extended or adjusted under 35 U.S.C. 154(b) by 228 days.

(21) Appl. No.: 13/822,414

(22) PCT Filed: Sep. 21, 2011

(86) PCT No.: PCT/EP2011/004724
§ 371 (c)(1),
(2), (4) Date: Mar. 12, 2013

(87) PCT Pub. No.: WO2012/045398
PCT Pub. Date: Apr. 12, 2012

(65) Prior Publication Data
US 2013/0170902 A1    Jul. 4, 2013

(30) Foreign Application Priority Data
Oct. 5, 2010    (DE) .......................... 10 2010 047 380

(51) Int. Cl.
*F16B 2/12*    (2006.01)
*B23B 31/10*    (2006.01)
(Continued)

(52) U.S. Cl.
CPC . *F16B 2/12* (2013.01); *B23B 31/10* (2013.01); *B25B 1/103* (2013.01); *B25B 1/2405* (2013.01); *F16B 5/0036* (2013.01); *F16B 21/09* (2013.01); *Y10T 403/581* (2015.01); *Y10T 403/7067* (2015.01)

(58) Field of Classification Search
CPC ....... F16B 21/09; F16B 5/0036; B23B 31/10; B25B 1/103
USPC .................. 403/11, 19, 187, 188, 374.4, 362; 279/46.2, 89, 93, 94, 99
See application file for complete search history.

(56) References Cited

U.S. PATENT DOCUMENTS 3,721,154 A    3/1973  Leibinger et al.
4,192,623 A *  3/1980  Borg .......................... 403/232.1
(Continued)

FOREIGN PATENT DOCUMENTS

DE    18 64 150 U    12/1962
DE    126 68 940 B    5/1968
(Continued)

*Primary Examiner* — Michael P Ferguson
*Assistant Examiner* — Jonathan Masinick
(74) *Attorney, Agent, or Firm* — McGlew and Tuttle, P.C.

(57) ABSTRACT

A linear mechanical quick release fastener is operated by three movements with self-centering chucks and for mounting all types of compatible clamping devices for machining workpieces, especially on automatic precision machine tools. A bottom part has raised locking elements formed integrally in one piece one after another on a plane along a direction at right angles to a clamping direction and base jaws formed integrally in one piece, with a threaded hole for a clamping bolt and a screw element. A top part has recesses, one after another along a direction at right angles to the clamping direction, designed as a counterpiece of the locking elements. One recess is connected at an open front side to a mounting area recessed continuously, which is accessible from the top, and another recess is open on a front side. The top part can receive an upper plane of any compatible clamping device.

18 Claims, 1 Drawing Sheet

(51) Int. Cl.
  *B25B 1/10*   (2006.01)
  *B25B 1/24*   (2006.01)
  *F16B 5/00*   (2006.01)
  *F16B 21/09*   (2006.01)

(56) References Cited

U.S. PATENT DOCUMENTS

| | | | | |
|---|---|---|---|---|
| 4,258,464 | A | * | 3/1981 | Ullman, Jr. ................ 29/525.01 |
| 4,270,591 | A | * | 6/1981 | Gill et al. ....................... 411/112 |
| 4,473,316 | A | * | 9/1984 | Welch ........................... 403/246 |
| 5,289,665 | A | * | 3/1994 | Higgins ........................ 52/655.1 |
| 5,740,650 | A | * | 4/1998 | Seiber et al. ................. 52/584.1 |
| 5,768,948 | A | * | 6/1998 | Hosoi et al. ..................... 74/552 |
| 5,893,551 | A | | 4/1999 | Cousins et al. |
| 6,033,145 | A | * | 3/2000 | Xu et al. ....................... 403/256 |
| 6,682,056 | B1 | * | 1/2004 | West .......................... 256/65.03 |
| 6,754,992 | B1 | * | 6/2004 | Byfield et al. ................. 52/36.5 |
| 2004/0032071 | A1 | | 2/2004 | Garrison |
| 2008/0174077 | A1 | * | 7/2008 | Lang ............................. 279/121 |
| 2009/0016807 | A1 | * | 1/2009 | Koch ................................ 403/26 |
| 2013/0287482 | A1 | * | 10/2013 | Busch et al. .................. 403/287 |

FOREIGN PATENT DOCUMENTS

| | | |
|---|---|---|
| DE | 20 43 855 A1 | 3/1972 |
| DE | 199 38 856 A1 | 2/2001 |
| EP | 0 890 418 A2 | 1/1999 |
| EP | 2 105 257 A2 | 9/2009 |

\* cited by examiner

LINEAR MECHANICAL QUICK-RELEASE FASTENER

CROSS REFERENCE TO RELATED APPLICATIONS

This application is a United States National Phase application of International Application PCT/EP2011/004724 and claims the benefit of priority under 35 U.S.C. §119 of German Patent DE 10 2010 047 380.4 filed Oct. 5, 2010, the entire contents of which are incorporated herein by reference.

FIELD OF THE INVENTION

The present invention pertains to a linear mechanical quick release fastener for locking and unlocking compatible clamping device especially on self-centering chucks on automatic precision machine tools for mass production and small-lot production.

BACKGROUND OF THE INVENTION

A plurality of linear mechanical quick release fasteners are known, which utilize the principle of a linear quick release fastener as well as of a dovetail-shaped guide for the closing parts, for example, in machine tools that are used by craftsman and amateur do-it-yourselfers for drilling, screwing, milling and grinding. These machines are often supplied with energy from a battery. These batteries are partly connected to the machine via a dovetail-shaped guide and locked by snapping in.

Utility Model DE 1 864 150 U discloses a device for locking and unlocking foaming molds, which comprises a top mold and a bottom mold and at which a quick release fastener is arranged, which can be opened and closed by a plurality of raised locking elements arranged next to each other and linear displacement by means of locking straps.

DE 1 268 940 A discloses a positive-locking coupling between a cutter and a cutter holder, both of which have the same angular cross section and are displaceable in a guide surrounding them on all sides in the longitudinal direction of the cutter holder shaft, in a gear shaping machine that is equipped with radially arranged tools and machines all engaging a gear simultaneously, in which the two coupling parts are detachably coupled by means of an intermeshing tongue and groove connection arranged at right angles to the shaft of the cutter holder. The groove and tongue extend at right angles or at right to the direction of cutting of the cutter and continuously over the entire width of the cutter and cutter holder, such that only one and the same transmission surface acts for each of the two directions of displacement along the shaft. The object of this solution is to substantially reduce the costs for the changing or replacement of the cutter at equal capacity.

Finally, DE 20 43 855 A discloses a tool mount for fastening a tool or tool part provided with a fastening shaft or pin to the ram or to the spindle of a machine tool, which said tool mount comprises a slot, which extends at right angles to the longitudinal axis of the working spindle and is open laterally at the edge. In the slot, the fastening shaft or pin can be clamped between the bottom of the slot and the surface of a closing piece meshing with the slot. The surface points towards said slot bottom. The object of this invention is to provide a machine tool of the type described that facilitates and simplifies especially the automatic tool change. The object is accomplished in that the closing piece is designed as a slide movable in the longitudinal direction of the ram or of the spindle and the width of the slot corresponds to the thickness of the fastening shaft or pin.

All the solutions described are directed towards special machine tools and can be used on a particular category of machines only. Furthermore, dovetail-shaped connections extend over the entire coupling area, which leads to long connection paths. Even though the last document is intended for an automatic tool change on machine tools, it is based on a certain type of tool holder, which cannot be found at each machine tool.

SUMMARY OF THE INVENTION

An object of the present invention is therefore to provide a linear mechanical quick release fastener that is easy to handle, can be made very small, guarantees very precise connection, can be operated mechanically essentially with three movements, can be used on all types of self-centering chucks and which can be used to mount all types of compatible clamping device for machining workpieces, especially on automatic precision machine tools.

The object is accomplished by a linear mechanical quick release fastener for locking and unlocking compatible clamping device especially on self-centering chucks on automatic precision machines tools in accordance with claim 1. The present invention is based on a prior-art linear mechanical quick release fastener, which has a bottom part and a top part, which have locking and mounting elements, which mesh with one another and are to be locked and unlocked by a linear motion in relation to one another in one plane. According to the invention the bottom part has at least two raised locking elements formed integrally in one piece one after another in a self-centering chuck along an axis at right angles to the clamping direction of the bottom part on one plane and two base jaws formed integrally in one piece on a lower plane, a central, continuous threaded opening for receiving a threaded spindle and a threaded hole for receiving a clamping bolt and a screw element on a front side of the two planes.

The design embodiment of the bottom part should be pointed out in particular, because it has, on the one hand, the lower part of the linear mechanical quick release fastener and, on the other hand, it permits the linear mechanical quick release fastener to be mounted on any self-centering chuck.

The top part of the linear mechanical quick release fastener has, on a lower plane, at least two recesses, which are recessed one after another in an axis at right angles to the clamping direction of a self-centering chuck, and which are designed as a counterpiece for receiving the locking elements of the bottom part, wherein a recess is connected on its open front side to a mounting area, which is recessed continuously and is accessible from the top, and the second recess with its front side is open at the end of the plane, and in which a mount can be arranged for any compatible clamping device in an upper plane.

It is advantageous in the top part as well, that it has, on the one hand, the second half of the linear mechanical quick release fastener and, on the other hand a universal mount for any compatible clamping device for the machining of workpieces.

The bottom part and the top part of the linear mechanical quick release fastener can therefore perform two functions. They can form a linear mechanical quick release fastener with one another and, moreover, they can be arranged, on the one hand, on a self-centering chuck and, on the other hand, receive a compatible clamping device for receiving a workpiece to be machined, as a result of which the linear quick release fastener according to the present invention can be used universally.

The design embodiment of the two parts of the linear mechanical quick release fastener according to the present invention guarantees rapid and simple handling thereof by placing the top part with the mounting area of one recess vertically on one of the locking elements of the bottom part and by snapping in both locking elements of the bottom part into the recesses of the top part by a short linear displacement of the top part in one direction and by locking with the clamping bolt arranged at the bottom part on the front side and with the screw element against the snapped-in top part and by unlocking in the opposite direction.

The mere placement of the top part on the bottom part and the only short linear path of displacement of the two parts is especially advantageous here. They simplify the connection per se and reduce the hitherto considerably long time required for changing the top part with the compatible clamping device arranged thereon. It is not necessary to insert the top part on the front side into the bottom part, also because the guide section of the locking elements and recesses is interrupted and it does not extend continuously, which does, in addition, have a space-saving effect if the compatible clamping device is arranged on the self-centering chuck of any desired precision machine tool.

Furthermore, it is necessary to emphasize the embodiment variant of the clamping planes of the linear mechanical quick release fastener, which is characterized in that additional locking elements, on the plane of the bottom part in an axis at right angles to the clamping direction of a self-centering chuck, the additional locking elements formed integrally in one piece in a raised manner one after another, and additional recesses recessed one after another in the plane of the bottom part in an axis at right angles to the clamping direction of a self-centering chuck can be arranged congruently also next to each other.

The size of the self-centering chucks and of the clamping device as well as of the workpieces clamped therein and the guaranteeing of a fast and yet precise quick connection can be taken into account with this variant despite heavy weights and acting physical forces associated therewith.

It is necessary to emphasize, in particular, the design embodiment of the locking elements of the bottom part and of the recesses of the top part by the locking elements of the bottom part and the recesses of the top part having a flat surface with chamfered edges as well, on the one hand, a straight front side and, opposite, a convex, half-round front side, and by the locking elements of the bottom part having a dovetail-shaped section extending around the outer contour as a tongue and the recesses of the top part having a dovetail-shaped section extending around the outer contour as a groove.

The shape of the connection elements of the linear mechanical quick release fastener according to the present invention guarantees an accurate and very precise quick connection. This embodiment can be manufactured and used for large and very small, small-dimension areas. In addition, the linear motion prior to locking through the half-round front sides is limited mechanically in a sliding manner and cannot jam. When the linear motion was performed until the end locking is not possible, which guarantees at the same time a high level of safety during the locking operation.

Of special significance is the design embodiment of the recesses in the top part of the linear mechanical quick release fastener according to claim 6 by a mounting area with a square shape, a vertical, flat inner contour and a chamfered top edge being formed integrally continuously at one recess.

This mounting area makes it possible to insert and remove the recesses onto and from the bottom part vertically and thus to replace compatible clamping device with a hitherto impossible speed and with high precision.

The present invention shall be described in more detail below on the basis of an exemplary embodiment, in which identical parts are designated by the same reference numbers. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
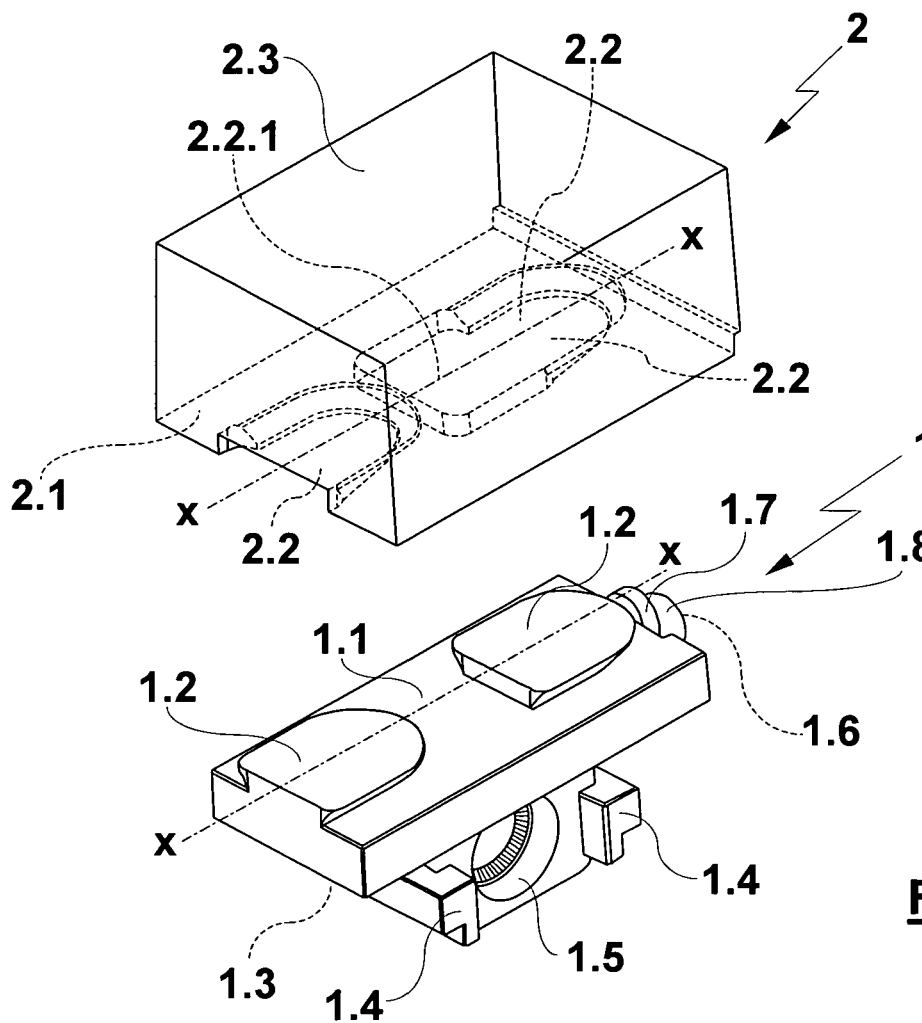
FIG. 1 is a perspective front view of a bottom part and of a top part of the linear mechanical quick release fastener according to the present invention in the open state.

Referring to the drawings in particular, in one embodiment, according to FIG. 1, the bottom part 1 is screwed onto the threaded spindle of a conventional self-centering chuck, not shown in more detail in the drawing, with its continuous threaded opening 1.5 at the lower plane 1.3 and inserted with the base jaw 1.4 formed integrally in one piece into the guide grooves thereof. Preferably two locking elements are formed integrally in one piece in a raised manner one after another along an axis x at right angles to the clamping direction of the imaginary self-centering chuck on the upper plane 1.1. These locking elements 1.2 have a flat surface with chamfered edges as well as preferably a straight front side, on the one hand, and, opposite a convex, half-round front side.

The top part 2 is provided on its lower plane 2.1 with preferably two recesses 2.2, which are recessed one after another along an axis x at right angles to the clamping direction of the self-centering chuck, not shown, and which are designed as a counterpiece [each] for receiving the locking elements 1.2 of the bottom part 1. A recess 2.2 is connected on its straight front side continuously to a recessed mounting area 2.2.1, which is accessible from the top, and the second recess 2.2 is open on its straight front side towards the end of plane 2.1. The recesses 2.2 have a flat inner surface and chamfered top edges. Like the locking elements 1.2, they have, on the one hand, a straight front side and, opposite, a convex, half-round front side. A mounting device for receiving a compatible clamping device, which is not shown in greater detail in the drawings and is used to receive a compatible clamping device, which is used to mount workpieces to be machined, is arranged on the upper plane 2.3 of the top part 2. The locking elements 1.2 of the bottom part 1 have a dovetail-shaped section extending around the outer contour as a tongue and the recesses 2.2 of the top part 2 have a dovetail-shaped section extending around the outer contour as a groove. The mounting area 2.2.1 formed integrally continuously at one recess 2.2 at the top part 2 preferably has a square shape with a vertical, flat inner contour and with a chamfered top edge.

Figure 2:
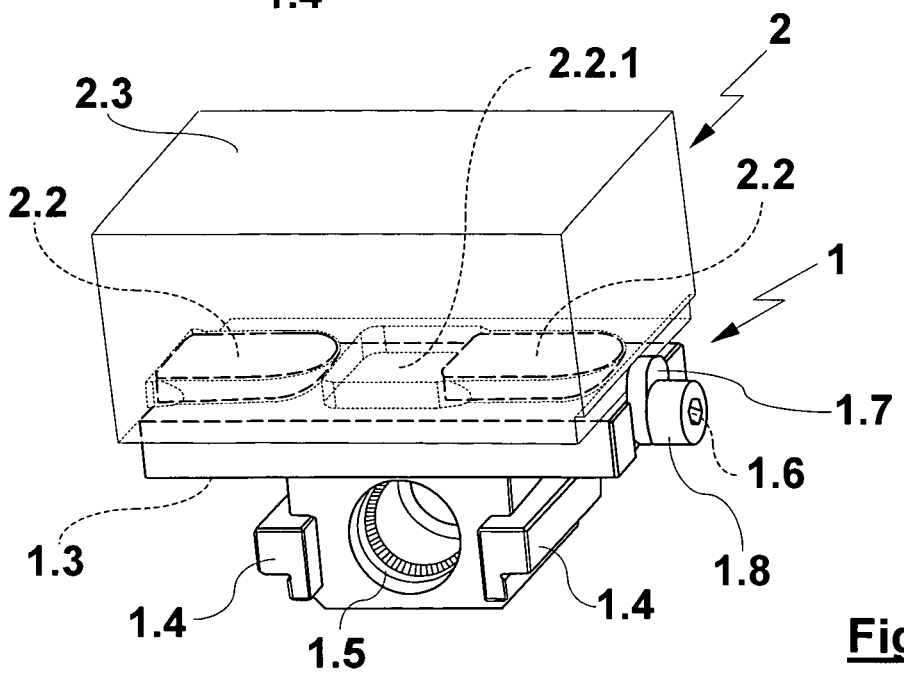
FIG. 2 is a perspective top view of a bottom part and of a top part of the linear mechanical quick release fastener according to the present invention in the locked state.

According to FIG. 2, the top part 2 is placed with the mounting area 2.2.1 of one recess 2.2, which said mounting area is recessed at the lower plane 2.1, on one of the locking elements 1.2 of the bottom part 1 and the two locking elements 1.2 of the bottom part 1 are inserted into the recesses 2.2 of the top part 2 by a linear displacement of the top part 2 in one direction. Both parts of the quick release fastener are now located symmetrically one on top of another. The two quick release fastener parts are to be locked against each other with the clamping bolt 1.7 arranged on the front side at the bottom part 1 and with the screw element 1.8. If the compatible clamping device arranged on the upper plane 2.3 of the top part 2, which clamping device is not shown in more detail in the drawings, with the machined workpiece is to be removed from the self-centering chuck of the precision machine tool, screw element 1.8 is loosened, the clamping bolt 1.7 is unlocked, the top part 2 is displaced linearly in the opposite direction, and it can be removed vertically from the bottom part 1.

While specific embodiments of the invention have been shown and described in detail to illustrate the application of the principles of the invention, it will be understood that the invention may be embodied otherwise without departing from such principles.

The invention claimed is:

1. A linear mechanical quick release fastener for locking and unlocking a compatible clamping device on automatic precision machine tools, the fastener comprising:
 a bottom part having at least two locking elements formed integrally in one piece one after another and in a raised manner along an axis at right angles to a clamping direction of a self-centering chuck on a plane and said bottom part having two base jaws formed integrally in one piece on a lower plane, a central, continuous threaded opening for receiving a threaded spindle and a threaded hole on an end face of the plane and the lower plane for receiving a clamping bolt and a screw element; and
 a top part having a top part lower plane with at least two recesses which are recessed one after another along an axis at right angles to the clamping direction: each of the recesses forming a counterpiece for receiving one of the locking elements of the bottom part, wherein one of said recesses is connected on an open front side to a mounting area, which is recessed continuously and another of said recesses is open with an end face on an end of the top part lower plane and has an upper plane, which can receive any compatible clamping device;
 wherein the mounting area of one recess of the top part mounts onto one of the locking elements of the bottom part, and the two locking elements of the bottom part snap into the recesses of the top part by a linear displacement of the top part and are to be locked with the clamping bolt arranged at the bottom part on the front side extending to a cutout recessed shoulder of a front side of the top part and with the screw element thereby preventing reverse linear displacement of the top part with respect to the bottom part and are unlocked by a reverse procedure, said mounting area and said one of said recesses forming a continuous recess, said continuous recess having a shape that is different from a shape of said another one of said recesses.

2. A linear mechanical quick release fastener for locking and unlocking a compatible clamping device on automatic precision machine tools, in accordance with claim 1, further comprising:
 additional locking elements formed integrally in one piece one after another in a raised manner on the plane of the bottom part along the axis at right angles to the clamping direction; and
 additional recesses recessed one after another in the top part plane along the axis at right angles to the clamping direction congruently, next to each other.

3. A linear mechanical quick release fastener for locking and unlocking a compatible clamping device on automatic precision machine tools, in accordance with claim 1, wherein the locking elements of the bottom part and the recesses of the top part have a flat surface with chamfered edges as well as a straight front side, and, opposite thereto, a convex, half-round side.

4. A linear mechanical quick release fastener for locking and unlocking a compatible clamping device on automatic precision machine tools, in accordance with claim 1, wherein the locking elements of the bottom part have a dovetail-shaped section extending around an outer contour as a tongue and the recesses of the top part have a dovetail-shaped section extending around an outer contour as a groove.

5. A linear mechanical quick release fastener for locking and unlocking a compatible clamping device on automatic precision machine tools, in accordance with claim 1, wherein the mounting area formed continuously integrally in one piece at one recess has a square shape with a vertical, flat inner contour and with a chamfered upper edge.

6. A linear mechanical quick release fastener for locking and unlocking a compatible clamping device on automatic precision machine tools, in accordance with claim 1, wherein the two base jaws and the central, continuous threaded opening for receiving a threaded spindle can be arranged on any desired self-centering chuck.

7. A linear mechanical quick release fastener for locking and unlocking a compatible clamping device on automatic precision machine tools, in accordance with claim 1, wherein the top part is equipped on the upper plane such that any compatible clamping device can be mounted, said threaded hole being located between said plane and said lower plane.

8. A linear mechanical quick release fastener comprising:
 a bottom part comprising locking elements extending in a raised manner from a planar surface, one after another along an axis direction, the locking elements being formed integrally in one piece and two base jaws formed integrally in one piece and with a central continuous threaded opening for receiving a threaded spindle and a threaded hole for receiving a clamping bolt, the axis direction being at a right angle to a receiving direction of the threaded opening and the threaded hole and a screw element on a side of the planar surface, said bottom part comprising another planar surface and an end surface located between said planar surface and said another planar surface, at least a portion of said threaded hole being located adjacent to said end surface; and
 a top part having a top part lower planar surface defining recesses disposed one after another along an axis direction at right angles to the receiving direction of the threaded opening and the threaded hole, each of the recesses forming a counterpiece for receiving one of the locking elements, wherein one of the recesses is connected on an open front side to a mounting area, which is recessed continuously and another of said recesses is open with an end face at an end of said top part lower planar surface and has an upper plane for receiving a clamping device;

wherein the mounting area mounts onto one of the locking elements, and the two locking elements snap into the recesses by a linear displacement of the top part and the top part and the bottom part are locked with the clamping bolt arranged at the bottom part on the front surface extending to a cutout recessed shoulder of a front surface of the top part and with the screw element thereby preventing reverse linear displacement of the top part with respect to the bottom part.

9. A linear mechanical quick release fastener, in accordance with claim 8, further comprising:

additional locking elements formed integrally in one piece one after another in a raised manner from the planar surface of the bottom part along the axis direction; and additional recesses recessed one after another along the axis direction.

10. A linear mechanical quick release fastener, in accordance with claim 8, wherein the locking elements and the recesses have a flat surface with chamfered edges as well as a straight front side and, opposite thereto, a convex, half-round side.

11. A linear mechanical quick release fastener, in accordance with claim 8, wherein the locking elements of the bottom part have a dovetail-shaped section extending around an outer contour as a tongue and the recesses of the top part have a dovetail-shaped section extending around an outer contour as a groove.

12. A linear mechanical quick release fastener, in accordance with claim 8, wherein the mounting area formed continuously integrally in one piece at one recess has a square shape with a vertical, flat inner contour and with a chamfered upper edge.

13. A linear mechanical quick release fastener, in accordance with claim 8, wherein the two base jaws and the central, continuous threaded opening for receiving a threaded spindle can be arranged on any self-centering chuck.

14. A linear mechanical quick release fastener, in accordance with claim 8, wherein the top part upper surface defines an interface mount compatible with clamping devices.

15. A linear mechanical quick release fastener in accordance with claim 8, wherein said threaded hole is located between said planar surface and said another planar surface, said end surface being located on said side of said planar surface.

16. A linear mechanical quick release fastener in accordance with claim 8, wherein said mounting area and said one of said recesses form a continuous recess, said continuous recess having a shape that is different from a shape of said another one of said recesses.

17. A linear mechanical quick release fastener comprising:

a bottom part comprising a threaded opening for receiving a threaded spindle, a threaded hole for receiving a clamping bolt, two base jaws, a planar surface and locking elements extending in a raised manner from said planar surface, said locking elements being arranged one after another along an axis direction, the locking elements being formed integrally in one piece, said two base jaws formed integrally in one piece, said threaded opening being located between said two base jaws, said axis direction being at a right angle to a receiving direction of the threaded opening and the threaded hole and a screw element on a side of the planar surface, said bottom part comprising another planar surface, said threaded hole being located between said another planar surface and said planar surface; and a top part on having a top part lower planar surface defining recesses disposed one after another along an axis direction at right angles to the receiving direction of the threaded opening and the threaded hole, said top part lower planar surface facing in a direction of said two base jaws, each of the recesses forming a counterpiece for receiving one of the locking elements, wherein one of the recesses is connected on an open front side to a mounting area, which is recessed continuously, and another of said recesses is open with an end face at an end of said top part lower planar surface and said top part has an upper plane for receiving a clamping device;

wherein the mounting area mounts onto one of the locking elements, and the two locking elements snap into the recesses by a linear displacement of the top part and the top part and the bottom part are locked with the clamping bolt arranged at the bottom part on the front surface extending to a cutout recessed shoulder of a front surface of the top part and with the screw element thereby preventing reverse linear displacement of the top part with respect to the bottom part.

18. A linear mechanical quick release fastener in accordance with claim 17, wherein said bottom part comprises an end surface located between said planar surface and said another planar surface, said threaded hole being located adjacent to said end surface, said mounting area and said one of said recesses forming a continuous recess, said continuous recess having a shape that is different from a shape of said another one of said recesses, said clamping bolt being located adjacent to said end surface.

\* \* \* \* \*